July 4, 1944.  J. W. ARMBRUSTER  2,353,003

RECORD SENSING DEVICE

Original Filed Dec. 30, 1937

INVENTOR
John W. Armbruster
BY
ATTORNEY

Patented July 4, 1944

2,353,003

UNITED STATES PATENT OFFICE 2,353,003

RECORD SENSING DEVICE

John W. Armbruster, East Rockaway, N. Y., assignor to International Business Machines Corporation, New York, N. Y., a corporation of New York Original application December 30, 1937, Serial No. 182,455. Divided and this application November 15, 1940, Serial No. 365,764

4 Claims. (Cl. 235—61.11)

This application is a division of copending application Serial No. 182,455, filed December 30, 1937.

This invention relates to an improved form of record for controlling an accounting machine wherein the records may remain undisturbed in a file while being analyzed to control devices for accumulating and printing the data represented thereon. The novel construction of the record as a machine control element is also a feature of this invention, because it is by means of selectively connected conducting lines on or controlled by the record that a series of records may be sensed successively, even when filed close together in a compartment or file drawer. Heretofore, in order that accounting information could be gathered from record cards, it was necessary to remove such cards from a file, place them in an accounting machine, feed and sense them one by one, and then return them to the file.

Another object of the invention is the provision of a machine control element in the form of a sheet of insulation material with a network of electric conducting lines thereon with ten of said lines representing the ten digits and other of the lines selectively connected thereto to form a readout device.

An object of the invention is the provision of means for sensing a stationary perforated record, said means comprising a pair of grids with wires adapted to be pressed against both sides of the record; the wires on one grid representing digits and the wires on the other grid selectively contacting therewith through the perforations in the record to form an electric readout means representing the number characterized by the locations of the perforations in the record.

Another object of the invention is the provision of data readout connections on a machine control element, said connections extending to the edges of said element so that even when a series of such elements are stacked together, the data on a confined element may be sensed by electrically analyzing the terminals of said connections at the edge of the element.

An object of the invention is the provision of sensing devices adapted to cooperate with perforated records formed of thin paper stock. Since the records remain stationary and are supported by the grids, they need not be formed of stiff card stock; instead, thin inexpensive paper may be used.

Other objects of the invention will be pointed out in the following description and claims and illustrated in the accompanying drawing, which discloses, by way of example, the principle of the invention and the best mode, which has been contemplated, of applying that principle.

Figure 7:
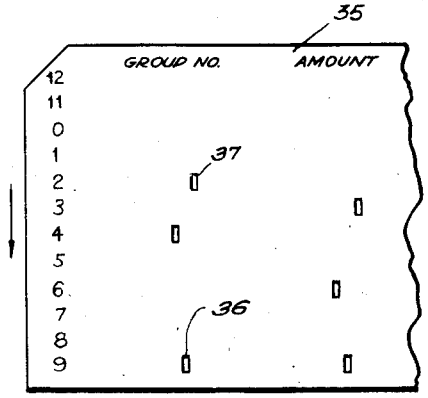
Fig. 7 shows a portion of an ordinary perforated record card.

The invention is disclosed in the form of devices associated with tabulating machines, such as those disclosed in the Bryce Patent No. 1,902,013 and Daly Patent No. 1,762,145. Machines of this kind are ordinarily operated by feeding perforated records such as the record 35 (Fig. 7) through the machine in the direction of the arrow in Fig. 7. The perforations on the record are sensed as the record moves and the location of the perforation on the record controls the timing of impulses for regulating the various accumulating, printing and group control devices. It is noted in Fig. 7 that a perforation 36 representing the digit 9 is situated near the bottom of the record so that it is sensed early in the operating cycle and thereby distinguishes from a perforation 37 representing the digit 2 which is sensed later in the operating cycle. Thus, it is evident that the functioning of the machine depends upon a movement of the record to control the timing of impulses initiated by the appearance of perforations in the record.

The devices of the present invention differ from the ordinary tabulator control by providing electrical devices for analyzing the records while at rest and providing conducting wires cooperating with the record in such a fashion that differentially timed impulses are directed through connections established at the index points where perforations are sensed.

According to the present invention, a pair of separate intersecting grids are brought into contact with opposite faces of a stationary perforated record, and extensions on the grids extend through the perforations into contact and form selective paths for the impulses which are timed to be representative of the data perforated in the record. A grid frame carries a set of horizontal lines or wires on one side and a set of vertical lines on the other side. When two such grids are brought together, there are a plurality of intersections, each coinciding with an index point of a tabulating record. The horizontal lines may be formed with eighty builtup extensions to project through any perforations found in the usual eighty column card. The vertical lines are formed with twelve extensions spaced evenly and coinciding in position with the twelve columnar positions illustrated in Fig. 7. When two grids are placed together, the extensions on vertical lines of one grid coincide with the extensions on the horizontal lines of the other grid, so that contact is established at all line intersection points on the grids. However, when a perforated record is placed between two grids, all line extensions are separated and insulated from each other except those extensions coinciding with a perforation.

Figure 1:
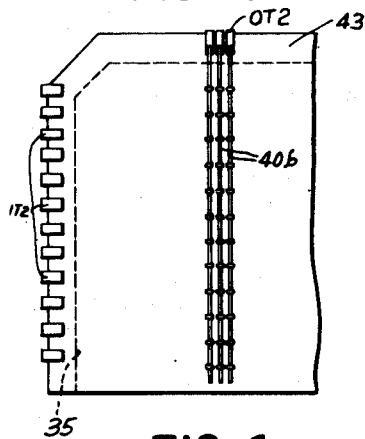
Fig. 1 is a view of a portion of a grid made by depositing metallic lines on paper.
Figure 2:
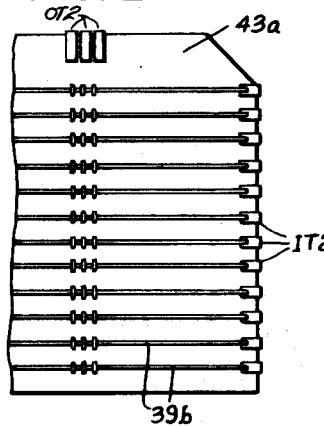
Fig. 2 is a view showing the other side of a grid such as that shown in Fig. 1.

In Figs. 1 and 2 there are shown portions of grids of a form elected for disclosure in this divisional case. The body 43 of the grid is made of a thin insulating material such as paper, "Bakelite," etc. On this material the conducting lines are built up by deposits of a metallic electric conducting substance distributed over the area of the grids in the form of vertical and horizontal lines. The vertical lines may be placed on a grid separate from the grid carrying the horizontal lines, or the different lines may be deposited on opposite sides of the same grid sheet.

Fig. 1 shows a grid containing the vertical lines 40b upon which raised index points are built up by successive deposits of the metallic substance at an angle to the vertical line. There are twelve such raised deposits along the length of the vertical line, each deposit appearing at a point coincident with the regular twelve index points on a perforated record. In a similar fashion the horizontal lines 39b (Fig. 2) are built up at regular intervals coincident with the 80 columns of the ordinary tabulating card.

The edges of these paper grids are provided with terminals IT2 and OT2. The impulses directed through the grids are received at input terminals IT2 (Fig. 2) and pass through the horizontal lines 39b of one grid, thence through the perforations in the record to the vertical lines 40b (Fig. 1) of another grid and up to output terminals OT2 on the upper edge of the grid sheet 43. Each of the twelve horizontal lines 39b is connected to one of the terminals IT2 and insulated from all others by the composition of the sheet. In a similar manner, each of the eighty vertical lines 40b is connected to one of the terminals OT2 and insulated from all others. In connection with the paper sheet grids of the present modification, care is taken to ensure contact between the lines on the grid and the terminals. The method of establishing such contact is shown in successive steps illustrated in Figs. 4, 5 and 6.

Figure 4:
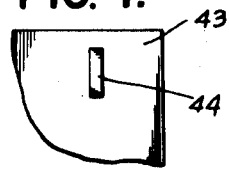
Figs. 4, 5 and 6 show the successive steps to be taken in depositing a metallic line on a sheet of material and associating a contact terminal therewith.
Figure 5:
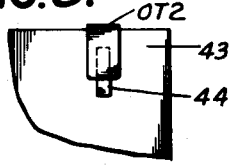
Figure 6:
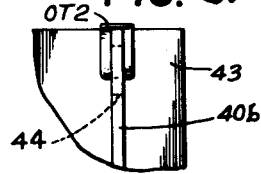

Fig. 4 shows a deposit 44 of metallic substance near the top edge of the material 43 comprising the body of the grid. This is the first step performed in attaching a terminal. In the second step, Fig. 5, the terminal OT2 is clipped around the upper edge of the grid 43 in contact with the deposit 44 which projects below the bottom edge of the terminal. The surface of the side of the terminal is roughened to provide a receptive surface for further deposits of the metallic substance. Fig. 6 shows the appearance of the record after the third and final operation during which a vertical line 40b is deposited over the grid 43, running up over the previous deposit 44 and passing over the outer surface of the terminal OT2. Thus a double contact is established between line 40b and terminal OT2.

Figure 3:
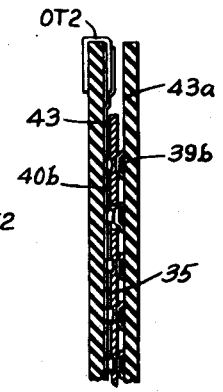
Fig. 3 is a detail view of grids such as those illustrated in Figs. 1 and 2 associated with a perforated record.

Fig. 3 is a sectional view showing how the paper grids 43 and 43a cooperate with a thin perforated record 35 so that the metallic lines establish contact through the perforations.

It is understood that when operating with any of the previously described grid constructions, pressure is applied at the sides to insure contact between line projections coinciding with perforations in the records.

It is contemplated that a plurality of grid assemblies be placed in a compact formation in a drawer or file and there be analyzed electrically to control a tabulating machine by impulses received just as though they came from a succession of moving record cards.

As explained in application Serial No. 182,455, of which the present case is a division, an impulse emitter is provided and driven in synchronism with the operation of the tabulating machine. The control impulses from the emitter are directed through the horizontal lines 39b, at differential times. The bottom line 39b receives the first impulse which coincides in time with the usual "9" impulse of the ordinary tabulator cycle. A second impulse is directed into the horizontal line 39b, second from the bottom, and the other impulses follow in order up the grid sheet. Should one of the vertical lines 40b in one grid sheet protrude through a "9" perforation 36 (Fig. 7) in contact with the lowest horizontal line 39b on another grid sheet, it is apparent that the "9" impulse will be received and transmitted through the upper terminal OT2. In a similar fashion any other differentially timed impulse will be carried along a related horizontal line, picked out by the contacting vertical line and carried up to the output terminal OT2, at which point it passes through a contacting connection and is carried into the adding or printing control devices of the tabulator.

When the tabulator is connected for control by the grid analyzers of the present invention, the usual upper and lower brushes are not used and the plug wiring therefrom may be removed from the sockets connected to the adding, printing and group control magnets. The card feeding unit is not used but it may be allowed to operate without placing any records in the magazine. The usual upper and lower card lever contacts ordinarily close when cards are fed through the regular sensing unit, but in the present instance they may be shunted by closing switches to provide shunt circuits around the contacts.

The impulse emitter already mentioned is provided for initiating in each cycle a set of twelve differentially timed impulses corresponding with the impulses usually sensed when reading the perforations of a moving record card. This emitter is connected to be driven by the mechanism in the tabulator. Although the grid assemblies remain stationary in a file, they are analyzed singly as though in motion by the successive timing of the impulses. The different records in the grids are considered in succession by movement of a contacting structure placed in the file and provided with an escapement mechanism for controlling movement of the contactors over the grid terminals so that one record after another is brought into association with the sensing control.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. A machine control device comprising a pair of sheets of grid paper, each paper containing metallic horizontal lines on one side and vertical metallic lines on the other side, said lines having built-up extensions of metallic deposits at regular index points, whereby a pair of such sheets when assembled with an interspersed perforated record permits sensing of the record in such an assembly by contact through the perforations representative of data and coincident with the index points of said grid sheets to allow certain built-up deposits of vertical lines of one grid to contact with certain built-up deposits of horizontal lines of the other grid.

2. As an article of manufacture, a thin rectangular sheet of insulation material, said sheet bearing two separated sets of spaced conducting lines, said sets arranged at right angles to each other, one of said sets having lines allocated to different data, said lines extending to the edges of said sheet, each of said lines also having spaced, outwardly extending portions along the length of the lines, at intervals and in number corresponding with the number and spacing of the set of lines other than the set of which the line is a member, whereby a plurality of such sheets when assembled with interspersed perforated records permits sensing of the records in a stack by contact of coinciding extending portions through the perforations.

3. A circuit connecting device comprising a pair of parallel sheets, one bearing a set of spaced conducting lines aligned in one direction and the other bearing a separate set of spaced conducting lines arranged at an intersecting angle with the first mentioned set, said sheets also having a plurality of common index point positions at the intersections of said lines, said lines being formed with coinciding and facing projections at all line intersections and said index point positions, whereby a record perforated to represent data can be placed between said sheets to secure contact between certain projections of intersecting lines at certain of said points coinciding with said perforations to conductively connect selected intersecting lines for a data reading from a thin pack of two sheets assembled with a perforated record.

4. A flat data retaining device, comprising a pair of sheets of insulation material, said sheets provided over a data representing area with a set of spaced horizontal conducting lines representing data value and a set of spaced vertical conducting lines representing ordinal position, said lines having portions extending toward each other and said sets arranged in contiguous relation and selectively contacting at intersecting points where the lines have said portions, with terminals of one set of lines exposed at one edge of one sheet and those of the other set also exposed at another edge of the other sheet, whereby a data sheet with differentially located data representing perforations can be inserted between said sets of lines to permit said contacting through such perforations so that data representing impulses can be directed into the horizontal set of lines, selectively pass through the data sheet at the contacting points and emerge from the other set of lines representing the data of the sheet while the device is stacked with similar devices.

JOHN W. ARMBRUSTER.